United States Patent
Ok et al.

(10) Patent No.: US 9,853,257 B2
(45) Date of Patent: Dec. 26, 2017

(54) BATTERY TRAY AND BATTERY CONTAINER INCLUDING THE SAME

(71) Applicant: Samsung SDI Co., Ltd., Yongin-si, Gyeonggi-do (KR)

(72) Inventors: Sung-Gen Ok, Yongin-si (KR); Jae-Ok Yi, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 349 days.

(21) Appl. No.: 14/669,556

(22) Filed: Mar. 26, 2015

(65) Prior Publication Data
US 2015/0280180 A1    Oct. 1, 2015

(30) Foreign Application Priority Data
Mar. 31, 2014    (KR) .................. 10-2014-0037960

(51) Int. Cl.
    *H01M 2/10*    (2006.01)
(52) U.S. Cl.
    CPC ......... *H01M 2/105* (2013.01); *H01M 2/1005* (2013.01)
(58) Field of Classification Search
    USPC ................................................ 429/155, 159
    See application file for complete search history.

(56) References Cited

U.S. PATENT DOCUMENTS

| | | | | |
|---|---|---|---|---|
| 2,209,927 | A * | 7/1940 | Nichols .................. | H01M 6/44 429/159 |
| 8,920,954 | B2 * | 12/2014 | Seong ................. | H01M 2/1027 429/149 |
| 2006/0208698 | A1 | 9/2006 | Maguire et al. | |
| 2012/0308875 | A1 * | 12/2012 | Geshi .................... | H01M 2/027 429/159 |
| 2016/0164054 | A1 * | 6/2016 | Yamamoto .......... | H01M 2/1077 429/61 |

FOREIGN PATENT DOCUMENTS

| | | |
|---|---|---|
| JP | 2007-227015 A | 9/2007 |
| JP | 2009-070614 A | 4/2009 |
| JP | 2011-233319 A | 11/2011 |
| KR | 10-2007-0120106 A | 12/2007 |

* cited by examiner

*Primary Examiner* — Tracy Dove
(74) *Attorney, Agent, or Firm* — Knobbe, Martens, Olson & Bear, LLP

(57) ABSTRACT

A battery tray and battery container including the same are disclosed. In one aspect, the battery tray includes an upper plate defining a plurality of openings each configured to accommodate a battery. The battery tray also includes a plurality of lower surfaces respectively corresponding to the openings and a plurality of lateral surfaces respectively connecting the openings in the upper plate to the lower surfaces. The upper plate, the lower surfaces, and the lateral surfaces are formed as a single piece.

20 Claims, 5 Drawing Sheets

BATTERY TRAY AND BATTERY CONTAINER INCLUDING THE SAME

RELATED APPLICATIONS

This application claims the benefit of Korean Patent Application No. 10-2014-0037960, filed on Mar. 31, 2014, in the Korean Intellectual Property Office, the disclosure of which is incorporated herein in its entirety by reference.

BACKGROUND

Field

The described technology generally relates to a battery tray and a battery container including the same.

Description of the Related Technology

Demand for circular and cylindrical secondary batteries has been markedly increasing in recent years. Particularly, due to increasing use of various mobile devices, the demand for circular or cylindrical batteries that can be used together with such mobile devices or used in the manufacture of such mobile devices has been increasing.

In meeting this demand, it is necessary to efficiently transport these batteries. However, techniques for efficiently transporting circular or cylindrical batteries have been not yet developed.

SUMMARY OF CERTAIN INVENTIVE ASPECTS

One inventive aspect is a battery tray configured to reduce damage during transportation and a battery container including the battery tray.

Another aspect is a battery tray including an upper plate in which a plurality of openings configured to receive batteries are formed; a plurality of lower surfaces corresponding to the openings; and a plurality of lateral surfaces connecting the upper plate and the lower surfaces, wherein the upper plate, the lower surfaces, and the lateral surfaces are formed in one piece.

The openings of the upper plate may be blocked by the lower surfaces and the lateral surfaces.

Each of the lower surfaces may have an area less than that of each of the openings.

The lower surfaces may meet the lateral surfaces at an obtuse angle.

Ribs may protrude from the lateral surfaces towards centers of the of openings. The ribs may be symmetric with respect to the centers of the openings. The number of the ribs may be three or more for each of the lateral surfaces.

The battery tray may further include a plurality of wings extending outward from edges of the upper plate, wherein the wings and the upper plate may be formed as one piece. The wings may be symmetric with respect to a center of the upper plate.

Another aspect is a battery container including a battery tray including an upper plate in which a plurality of openings configured to receive batteries are formed, a plurality of lower surfaces corresponding to the openings, and a plurality of lateral surfaces connecting the upper plate and the lower surfaces, wherein the upper plate includes a plurality of wings protruding outward from edges thereof, and the upper plate, the lower surfaces, and the lateral surfaces are formed as one piece; and a battery tray outer box including an outer lower surface and outer lateral surfaces which accommodate the battery tray, wherein the outer lateral surfaces are connected to the outer lower surface and extend in a direction crossing a plane on which the outer lower surface is place, includes a plurality of penetration holes or grooves which receive the wings.

The wings may be symmetric with respect to a center of the upper plate.

A first distance between a plane on which the wings are located and a plane on which the lower surfaces are located may be substantially equal to or less than a second distance between the outer lower surface and the penetration holes or grooves.

The openings of the upper plate may be blocked by the lower surfaces and the lateral surfaces.

Each of the lower surfaces may have an area less than that of each of the openings.

The lower surfaces may meet the lateral surfaces at an obtuse angle.

Ribs may protrude from the lateral surfaces towards centers of the openings. The ribs may be symmetric with respect to the centers of the openings. The number of the ribs may be three or more for each of the lateral surfaces.

The battery container may further include an upper tray including a plurality of recesses corresponding to the openings.

Another aspect is a battery tray, comprising an upper plate defining a plurality of openings each configured to accommodate a battery; a plurality of lower surfaces respectively corresponding to the openings; and a plurality of lateral surfaces respectively connecting the openings in the upper plate to the lower surfaces, wherein the upper plate, the lower surfaces, and the lateral surfaces are formed as a single piece.

The openings of the upper plate can be blocked by the lower surfaces and the lateral surfaces. The area of each of the lower surfaces can be less than that of each of the openings. Each of the lower surfaces can respectively meet the lateral surfaces at an obtuse angle. Each of the lateral surfaces can include a plurality of ribs protruding towards the respective centers of the openings. The ribs of each lateral surface can be substantially symmetrically arranged with respect to the respective centers of the openings. Each of the ribs can be formed as a concave indentation in the corresponding lateral surface. The battery tray can further comprise a plurality of wings extending outward from edges of the upper plate, wherein the wings and the upper plate are formed as a single piece. The wings can be substantially symmetrically arranged with respect to the center of the upper plate. Each of the lateral surfaces can be configured to prevent the battery accommodated in the corresponding opening from contacting the corresponding lower surface.

Another aspect is a battery container, comprising a battery tray including: an upper plate defining a plurality of openings each configured to accommodate a battery, a plurality of lower surfaces respectively corresponding to the openings, and a plurality of lateral surfaces respectively connecting the openings in the upper plate to the lower surfaces, wherein the upper plate comprises a plurality of wings protruding outward from edges thereof and wherein the upper plate, the lower surfaces, the lateral surfaces, and the wings are formed as a single piece; and an outer box including an outer lower surface and outer lateral surfaces accommodating the battery tray, wherein the outer lateral surfaces: are connected to the outer lower surface, are substantially perpendicular to the outer lower surface, and define a plurality of penetration holes or grooves respectively accommodating the wings.

The wings can be substantially symmetrically arranged with respect to the center of the upper plate. A first distance between the wings and the lower surfaces measured perpendicular to the upper plate can be substantially equal to or less than a second distance between the outer lower surface and the penetration holes or grooves measured perpendicular to the outer lower surface. The openings of the upper plate can be blocked by the lower surfaces and the lateral surfaces. The area of each of the lower surfaces can be less than that of each of the openings. Each of the lower surfaces can respectively meet the lateral surfaces at an obtuse angle. Each of the lateral surfaces can include a plurality of ribs protruding towards the respective centers of the openings. The ribs of each lateral surface can be substantially symmetrically arranged with respect to the respective centers of the openings. Each of the ribs can be formed as a concave indentation in the corresponding lateral surface. The battery container can further comprise an upper tray including a plurality of recesses respectively corresponding to the openings.

Other aspects will be clearly understood from the following detailed description, claims, and accompanying drawings.

DETAILED DESCRIPTION OF CERTAIN INVENTIVE EMBODIMENTS

Figure 1:
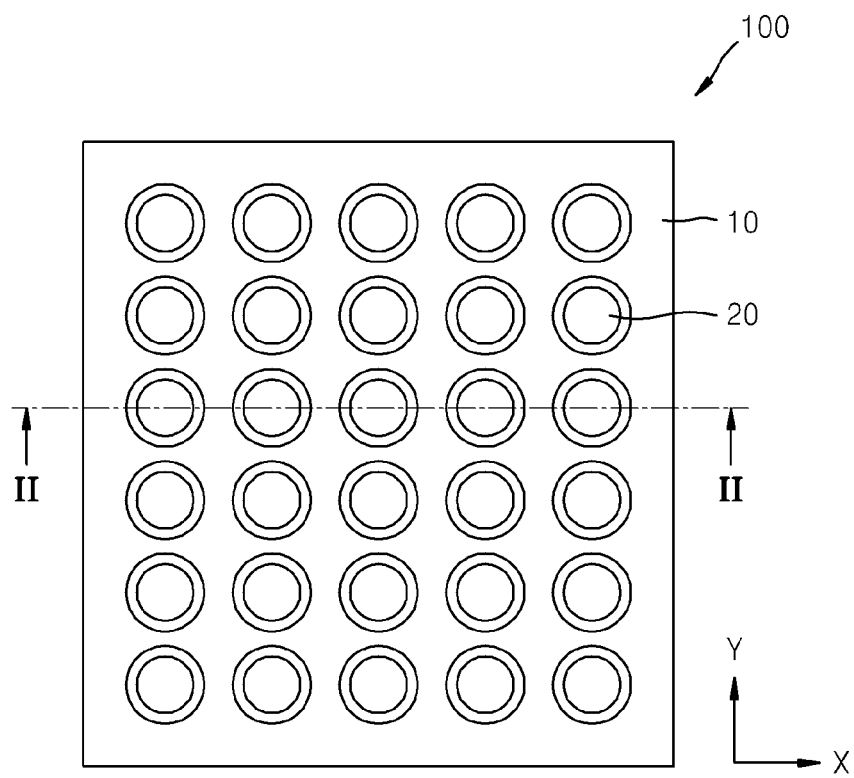
FIG. 1 is a schematic plan view illustrating a battery tray according to an embodiment.

Reference will now be made in detail to embodiments, examples of which are illustrated in the accompanying drawings. Effects and features of the embodiments, and implementation methods thereof, will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments will be described in detail with reference to the accompanying drawings. In the drawings, like reference numerals denote like elements and overlapping descriptions thereof will be omitted.

It will be understood that when an element such as a layer, a film, a region, or a plate is referred to as being "above" or "on" another element, it can be directly on the other element, or intervening elements may also be present. In the drawings, the sizes of elements may be exaggerated for the sake of clarity. For example, in the drawings, the size or thickness of each element may be exaggerated for illustrative purposes, and thus, the described technology should not be construed as being limited thereto.

In the descriptions of the embodiments, the X, Y, and Z axes are not limited to the definition of the Cartesian coordinate system but may be differently defined or construed. For example, the X, Y, and Z axes may be orthogonal to each other or may not be orthogonal to each other.

Figure 2:
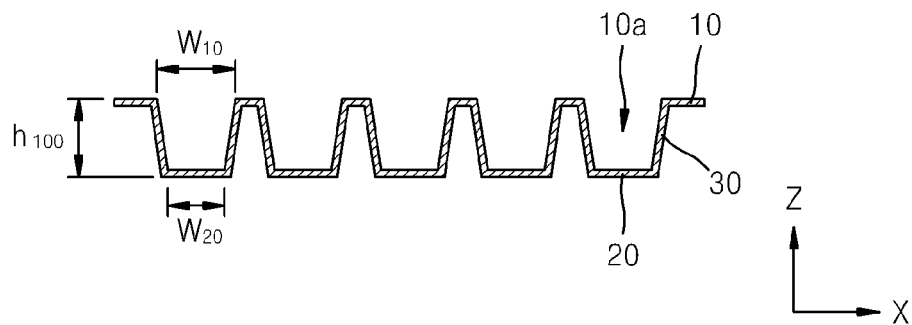
FIG. 2 is a schematic cross-sectional view taken along line II-II of FIG. 1.
Figure 3:
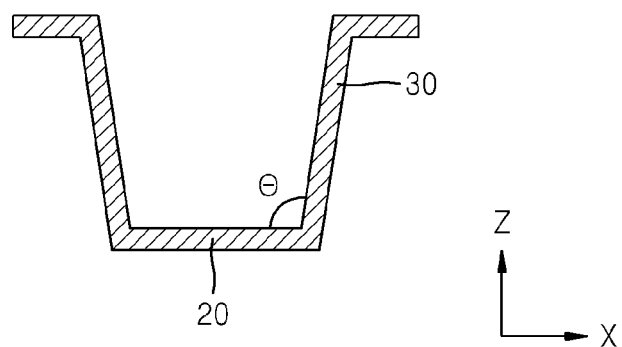
FIG. 3 is a schematic cross-sectional view illustrating a portion of the battery tray of FIG. 2.

FIG. 1 is a schematic plan view illustrating a battery tray 100 according to an embodiment. FIG. 2 is a schematic cross-sectional view taken along line II-II of FIG. 1. FIG. 3 is a schematic cross-sectional view illustrating a portion of the battery tray 100 of FIG. 2.

In the embodiment of FIGS. 1 to 3, the battery tray 100 includes an upper plate 10, a plurality of lower surfaces 20, and a plurality of lateral surfaces 30. A plurality of openings 10a are formed in the upper plate 10. The lower surfaces 20 correspond to the openings 10a of the upper plate 10 and are connected to the upper plate 10 through the lateral surfaces 30. The upper plate 10, the lower surfaces 20, and the lateral surfaces 30 may be formed in a single piece. The openings 10a of the upper plate 10 may be completely blocked by the lower surfaces 20 and the lateral surfaces 30.

In contrast to the battery tray 100 of the embodiment of FIGS. 1 to 3, the standard battery tray has a grating structure in which cross (+) shapes are repeatedly arranged. However, such battery trays are not durable when only partially filled. For example, when fewer batteries than a predetermined number of batteries are arranged in the standard battery tray and then transported, the cross (+) shaped grating structure of the battery tray may be deformed.

However, in the battery tray 100 according to the embodiment of FIGS. 1 to 3, the upper plate 10 having the openings 10a is connected to the lower surfaces 20 corresponding to the openings 10a through the lateral surfaces 30. In addition, the upper plate 10, the lower surfaces 20, and the lateral surfaces 30 are formed in a single piece. Thus, the battery tray 100 can reliably maintain its shape for safely accommodating protecting batteries during transportation.

In the embodiment of FIGS. 1 to 3, the area of each of the lower surfaces 20 is smaller than the area of each of the openings 10a of the upper plate 10. For example, when the lower surfaces 20 and the openings 10a have a substantially circular shape, the radius of each of the lower surfaces 20 is less than the radius of each of the openings 10a. Therefore, as shown in FIGS. 2 and 3, when viewed as a cross-section taken on a plane (i.e. the X-Z plane) passing through the centers of a set of the lower surfaces 20 and substantially perpendicular to the upper plate 10, the lower surfaces 20 meet the lateral surfaces 30 at an obtuse angle θ.

Figure 4:
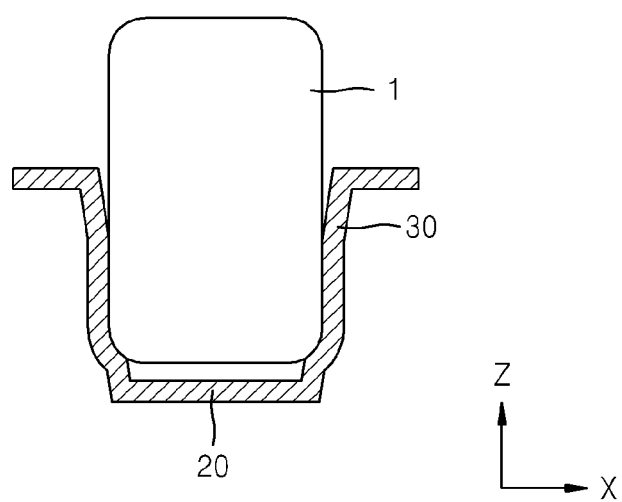
FIG. 4 is a schematic cross-sectional view illustrating a cylindrical battery inserted into the battery tray shown in FIG. 3.

A battery 1 may be inserted in the battery tray 100 as shown in FIG. 4. In detail, each of the openings 10a of the upper plate 10 has a sufficient size to receive the battery 1 and each of the lower surfaces 20 is smaller than each of the openings 10a of the upper plate 10. Therefore, when the battery 1 is inserted toward one of the lower surfaces 20 (in a negative (−) Z-axis direction), the lower edge of the battery 1 is brought into contact with a lateral surface 30.

Thus, as the lower portion of the battery 1 is surrounded by the lateral surface 30, the battery 1 can be fixed within the battery tray 100. After insertion, if the battery tray 100 is elastic and/or flexible, the lateral surface 30 can be deformed outward due to the contact with the lower portion of the battery 1 as shown in FIG. 4, and thus, the lower portion of the battery 1 can be securely brought contact with the lateral surface 30. Further, as shown in FIG. 4, the lower portion of the battery 1 is secured by the lateral surface 30 without contacting the lower surface 20. Accordingly, a minimum gap is maintained between the battery 1 and the lower surface 20.

Therefore, although a plurality of batteries 1 are arranged in the battery tray 100 of the current embodiment, the batteries 1 can be effectively fixed and thus damage to the batteries 1 during transportation can be minimized or eliminated. Particularly, when fewer than a predetermined number of batteries 1 are arranged on the battery tray 100, the batteries 1 can be stably transported since the battery tray 100 is structurally strong and able to fix the batteries 1 in place.

Figure 5:
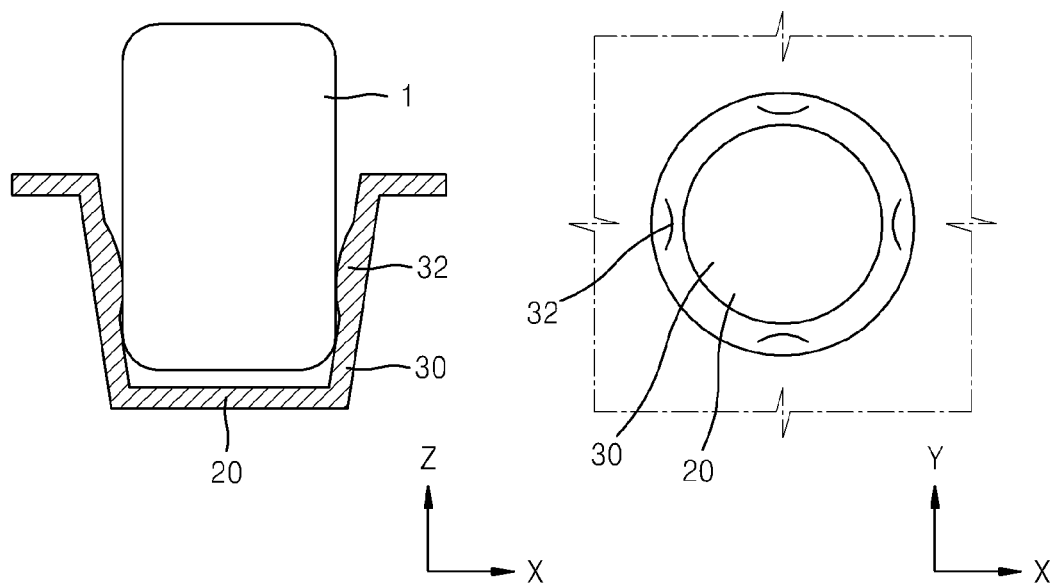
FIG. 5 is a schematic cross-sectional view illustrating a cylindrical battery inserted into a battery tray according to another embodiment.

FIG. 5 is a schematic cross-sectional view illustrating a cylindrical battery 1 inserted into a battery tray 100 according to another embodiment. The battery tray 100 of the embodiment of FIG. 5 further includes a plurality of ribs 32 separate from each other. The ribs 32 are formed on the lateral surfaces 30 and protrude toward the respective centers of the openings 10a. The ribs 32 may be elastic and or flexible. Thus, as shown in FIG. 5, when the battery 1 is inserted toward the lower surface 20 (negative (−) z-axis direction), a lower portion or at least a lateral portion of the battery 1 is brought into contact with the ribs 32 of the battery tray 100.

Then, as the lower portion or lateral portion of the battery 1 is pushed or supported by the ribs 32, the batteries 1 can be fixed in place. After insertion, if the battery tray 100 is elastic and/or flexible, the ribs 32 of the battery tray 100 can be deformed outward by the lower portion of the battery 1 as shown in FIG. 5, and thus, the lower portion of the battery 1 can be securely brought contact with the ribs 32.

Therefore, when a plurality of batteries 1 are arranged in the battery tray 100 of the FIG. 5 embodiment, the batteries 1 can be effectively fixed by the ribs 32 and thus damage to the batteries 1 during transportation can be minimized or eliminated. Particularly, when fewer than a predetermined number of batteries 1 are arranged on the battery tray 100, the batteries 1 can be stably transported since the battery tray 100 is structurally strong and the ribs 32 fix the batteries 1 in place.

The ribs 32 may be symmetrically arranged with respect to the centers of the openings 10a of the upper plate 10. Three or more ribs 32 may be provided for each of the openings 10a. For example, three ribs 32 may be arranged to be about 120° apart around the center of each opening 10a (when viewed in the X-Y plane). In FIG. 5, for example, four ribs 32 are arranged in each of the openings 10a.

As shown in FIG. 4, if all the lower portion of the battery 1 contacts the lateral surface 30 of the battery tray 100, the battery 1 may not be smoothly pulled out of the battery tray 100 because of the friction therebetween. In the embodiment of FIG. 5, however, the lower portion of the battery 1 is not entirely brought into contact with the ribs 32 of the battery tray 100. That is, as shown in FIG. 5, the lower portion of the battery 1 is brought into partial contact with the ribs 32 at regions corresponding to the ribs 32. Therefore, the contact area between the lower portion of the battery 1 and the ribs 32 of the battery tray 100 is less than in the embodiment shown in FIG. 4, and thus, the battery 1 can be smoothly pulled out of the battery tray 100.

Figure 6:
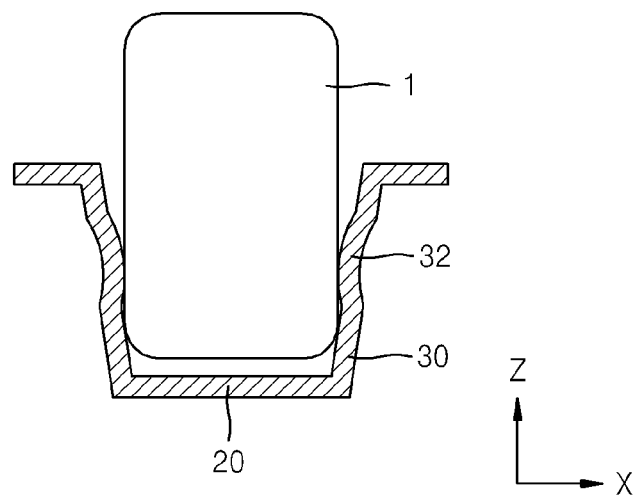
FIG. 6 is a schematic cross-sectional view illustrating a cylindrical battery inserted into a battery tray according to another embodiment.

In the battery tray 100 of the FIG. 5 embodiment, the outer surfaces of the lateral surfaces 30 opposing the centers of the openings 10a are substantially flat. However, in the embodiment of FIG. 6, the lateral surfaces 30 opposing the centers of the openings 10a are concave toward the centers of the openings 10a. FIG. 6 is a schematic cross-sectional view illustrating a cylindrical battery 1 inserted in a battery tray 100 according to another embodiment. In the latter embodiment, the ribs 32 can be considered as portions of the lateral surfaces 30 curved toward the centers of the openings 10a. As such, the ribs 32 of the FIG. 6 embodiment can be formed as indentations in the corresponding lateral surfaces 30.

Figure 7:
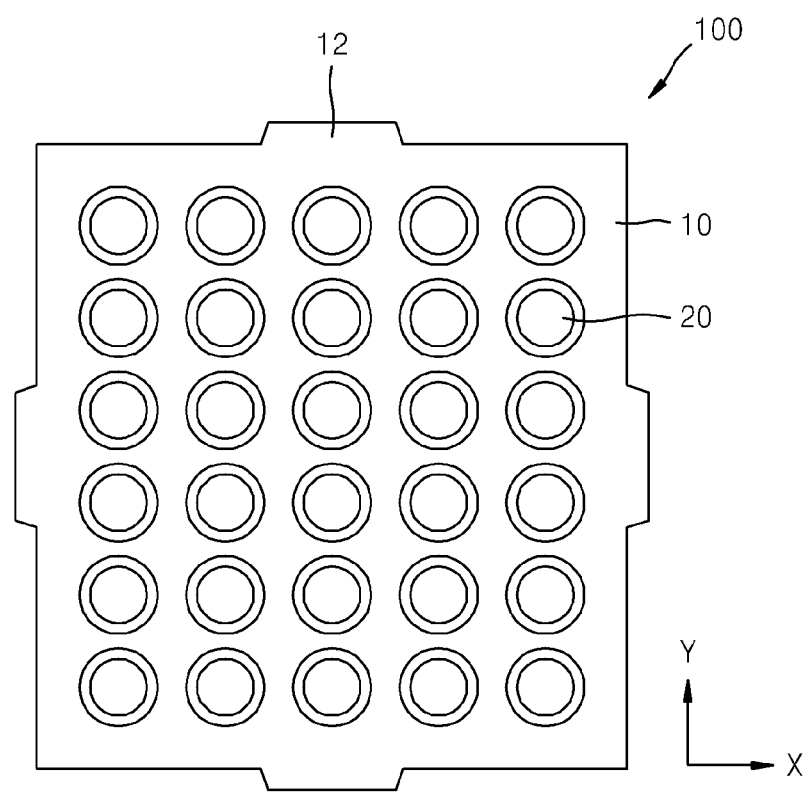
FIG. 7 is a schematic plan view illustrating a battery tray according to another embodiment.

FIG. 7 is a schematic plan view illustrating a battery tray 100 according to another embodiment. Referring to FIG. 7, the battery tray 100 of the embodiment includes a plurality of wings 12 protruding outward from edges of the upper plate 10. The wings 12 and the upper plate 10 may be formed in a single piece. That is, the wings 12, the upper plate 10, the lower surfaces 20, and the lateral surfaces 30 can be formed as a single piece. As shown in FIG. 7, the wings 12 are symmetric with respect to the center of the upper plate 10.

Figure 8:
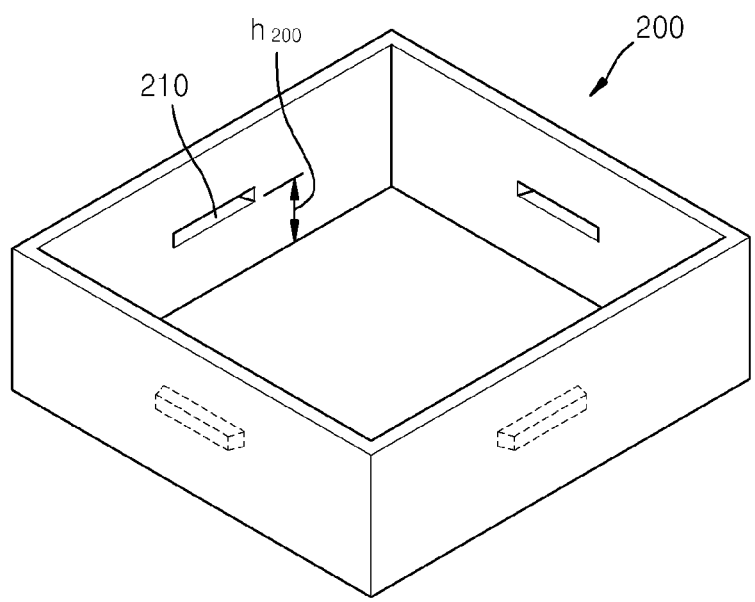
FIG. 8 is a schematic perspective view illustrating a battery container according to an embodiment.

The battery tray 100 of the FIG. 7 embodiment can be used together with a battery tray outer box or outer box 200 shown in FIG. 8 as a battery container. Referring to FIG. 8, the battery tray outer box 200 includes an inner space to accommodate the battery tray 100. The battery tray outer box 200 includes an outer lower surface and outer lateral surfaces connected to the outer lower surface and extending in a direction (i.e. positive (+) Z-axis direction) crossing a plane (i.e. X-Y plane) of the outer lower surface. Thus, the outer lateral surfaces enclose the outer lower surface. A plurality of penetration holes or grooves 210 are formed in the outer lateral surfaces from an inner side. In FIG. 8, a plurality of grooves 210 are formed.

The battery tray 100 shown in FIG. 7 can be connected to the battery tray outer box 200 shown in FIG. 8. In detail, the wings 12 of the battery tray 100 may be inserted into the penetration holes or grooves 210 formed in the outer lateral surfaces of the battery tray outer box 200 from an inner side. Then, the battery tray outer box 200 firmly holds the battery tray 100, and thus, batteries 1 can be stably accommodated in the battery tray 100.

A first distance h100 (refer to FIG. 2) between the plane on which the wings 12 are arranged and the plane on which the lower surfaces 20 are arranged is substantially equal to or less than a second distance h200 (refer to FIG. 8) between the penetration holes or grooves 210 and the outer lower surface. For example, the first distance h100 may be less than the second distance h200.

In these embodiment, after the wings 12 of the battery tray 100 are inserted into the penetration holes or grooves 210 formed in the outer lateral surfaces of the battery tray outer box 200 from an inner side, the lower surfaces 20 of the battery tray 100 are spaced apart from the outer lower surface of the battery tray outer box 200. That is, a gap is formed between the lower surfaces 20 of the battery tray 100 and the outer lower surface of the battery tray outer box 200. Therefore, when the battery container including the battery tray 100 and the battery tray outer box 200 assembled together is transported with a plurality of batteries 1 accommodated in the battery tray 100, when the battery container is impacted, the impact can be absorbed by the gap between the lower surfaces 20 of the battery tray 100 and the outer lower surface of the battery tray outer box 200. Accordingly, damage to the batteries accommodated in the battery tray 100 can be minimized or eliminated.

While the battery tray 100 has been described, the embodiments are not limited thereto. For example, battery containers including battery trays 100 and battery tray outer boxes 200 of the above-described embodiments or modifications thereof may also be included in the scope of the described technology.

Figure 9:
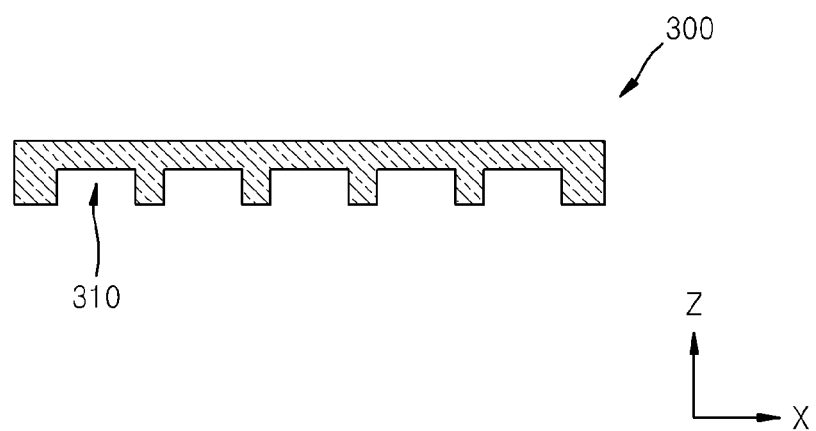
FIG. 9 is a schematic cross-sectional view illustrating an upper tray of a battery container according to another embodiment.

The battery container may further include an upper tray 300 shown in FIG. 9 as well as the battery tray 100 and the battery tray outer box 200. The upper tray 300 may include a plurality of recesses 310 corresponding to the openings 10a of the battery tray 100 so as to cover batteries 1 accommodated in the battery tray 100. The upper tray 300 is not limited to the shape shown in FIG. 9. For example, the upper tray 300 may have substantially the same shape as the battery tray 100 or other shapes.

As described above, according to at least one embodiment, damage to batteries can be reduced when the batteries are transported using the battery tray or the battery container. However, the scope and spirit of the described technology are not limited thereto.

It should be understood that the exemplary embodiments described herein should be considered in a descriptive sense only and not for purposes of limitation. Descriptions of features or aspects within each embodiment should typically be considered as available for other similar features or aspects in other embodiments.

While the inventive technology have been described with reference to the figures, it will be understood by those of ordinary skill in the art that various changes in form and details may be made therein without departing from the spirit and scope of the present invention as defined by the following claims.

What is claimed is:

1. A battery tray, comprising:
   an upper plate defining a plurality of openings each configured to accommodate a battery;
   a plurality of lower surfaces respectively corresponding to the openings; and
   a plurality of lateral surfaces respectively connecting the openings in the upper plate to the lower surfaces,
   wherein each of the lower surfaces respectively meets an end of the lateral surface at an obtuse angle along the entire respective lower surface,
   wherein each of the plurality of lateral surfaces is elastic or flexible, and
   wherein the upper plate, the lower surfaces, and the lateral surfaces are formed as a single piece.

2. The battery tray of claim 1, wherein the openings of the upper plate are blocked by the lower surfaces and the lateral surfaces.

3. The battery tray of claim 1, wherein the area of each of the lower surfaces is less than that of each of the openings.

4. The battery tray of claim 1, wherein each of the lateral surfaces includes a plurality of ribs protruding towards the respective centers of the openings.

5. The battery tray of claim 4, wherein the ribs of each lateral surface are substantially symmetrically arranged with respect to the respective centers of the openings.

6. The battery tray of claim 4, wherein each of the ribs is formed as a concave indentation in the corresponding lateral surface.

7. The battery tray of claim 1, further comprising a plurality of wings extending outward from edges of the upper plate, wherein the wings and the upper plate are formed as a single piece.

8. The battery tray of claim 7, wherein the wings are substantially symmetrically arranged with respect to the center of the upper plate.

9. The battery tray of claim 1, wherein each of the lateral surfaces is configured to prevent the battery accommodated in the corresponding opening from contacting the corresponding lower surface.

10. A battery container, comprising:
    a battery tray including: i) an upper plate defining a plurality of openings each configured to accommodate a battery, ii) a plurality of lower surfaces respectively corresponding to the openings, and iii) a plurality of lateral surfaces respectively connecting the openings in the upper plate to the lower surfaces, wherein each of the lower surfaces respectively meets an end of the lateral surface at an obtuse angle along, the entire respective lower surface, wherein each of the plurality of lateral surfaces is elastic or flexible, and wherein the upper plate comprises a plurality of wings protruding outward from edges thereof and wherein the upper plate, the lower surfaces, the lateral surfaces, and the wings are formed as a single piece; and
    an outer box including an outer lower surface and outer lateral surfaces accommodating the battery tray, wherein the outer lateral surfaces: i) are connected to the outer lower surface, ii) are substantially perpendicular to the outer lower surface, and iii) define a plurality of penetration holes or grooves respectively accommodating the wings.

11. The battery container of claim 10, wherein the wings are substantially symmetrically arranged with respect to the center of the upper plate.

12. The battery container of claim 10, wherein a first distance between the wings and the lower surfaces measured perpendicular to the upper plate is substantially equal to or less than a second distance between the outer lower surface and the penetration holes or grooves measured perpendicular to the outer lower surface.

13. The battery container of claim 10, wherein the openings of the upper plate are blocked by the lower surfaces and the lateral surfaces.

14. The battery container of claim 10, wherein the area of each of the lower surfaces is less than that of each of the openings.

15. The battery container of claim 10, wherein each of the lateral surfaces includes a plurality of ribs protruding towards the respective centers of the openings.

16. The battery container of claim 15, wherein the ribs of each lateral surface are substantially symmetrically arranged with respect to the respective centers of the openings.

17. The battery container of claim 15, wherein each of the ribs is formed as a concave indentation in the corresponding lateral surface.

18. The battery container of claim 10, further comprising an upper tray including a plurality of recesses respectively corresponding to the openings.

19. The battery container of claim 10, wherein the outer box encloses the battery tray.

20. The battery container of claim 10, wherein the outer lateral surfaces connect to the outer lower surface to form an enclosed inner space of the outer box, wherein the outer lateral surfaces and the outer lower surface encompass and enclose the battery tray within the inner space.

* * * * *